(12) United States Patent
Bajko et al.

(10) Patent No.: US 7,844,815 B2
(45) Date of Patent: *Nov. 30, 2010

(54) METHOD AND COMMUNICATION SYSTEM FOR CONTROLLING SECURITY ASSOCIATION LIFETIME

(75) Inventors: Gábor Bajko, Budapest (HU); Tao Haukka, Oulu (FI)

(73) Assignee: Nokia Corporation (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,811

(22) Filed: Jul. 29, 2008

(65) Prior Publication Data

US 2008/0295168 A1 Nov. 27, 2008

Related U.S. Application Data

(63) Continuation of application No. 10/345,418, filed on Jan. 16, 2003, now Pat. No. 7,434,258.

(60) Provisional application No. 60/377,965, filed on May 7, 2002.

(51) Int. Cl.
*H04L 29/06* (2006.01)
(52) U.S. Cl. .................. 713/155; 713/168; 726/4; 726/14; 726/21; 709/228
(58) Field of Classification Search .............. 726/4, 726/14, 21; 713/155, 168; 709/228
See application file for complete search history.

(56) References Cited

U.S. PATENT DOCUMENTS

| | | | |
|---|---|---|---|
| 5,642,398 A | 6/1997 | Tiedemann, Jr. et al. | |
| 6,891,819 B1 * | 5/2005 | Inoue et al. | 370/338 |
| 7,434,258 B2 * | 10/2008 | Bajko et al. | 726/21 |

OTHER PUBLICATIONS

J. M. Voas, "Limited Software Warranties," Reliable Software Technologies, Apr. 1999, pp. 1-6.

J. Franks, et al., "HTTP Authentication: Basic and Digest Access Authentication," Network Working Group, RFC 2617, Jun. 1999, pp. 1-31.

(Continued)

*Primary Examiner*—Michael Pyzocha
*Assistant Examiner*—Paul Callahan
(74) *Attorney, Agent, or Firm*—Mintz Levin Cohn Ferris Glovsky and Popeo, P.C.

(57) ABSTRACT

An apparatus and method for selecting a security association timer between user equipment and a control entity in a communication system are disclosed. The apparatus includes a transmitter configured to transmit a registration request message to a control entity in a communication system, whereby the registration request message is configured to request registration with the control entity. The apparatus further includes a receiver configured to receive an authentication challenge including a temporary timer, whereby the temporary timer is configured to set a time duration for the apparatus to respond to the authentication challenge. The receiver is further configured to receive an acknowledgement message including a security association timeout value in response to the transmitted registration message, whereby the security association timeout value includes a set time length of a security association equal to a registration time length set for registration of the apparatus. The transmitter is further configured to transmit a registration authentication message to the control entity before expiration of the temporary timer.

19 Claims, 2 Drawing Sheets

OTHER PUBLICATIONS

Delphine Plasse: SIP for Call Control in the 3G IP-Based UMTS Core Network, Internetworking 2000, LNCS 1938, 2000, Springer-Verlag Publishing, pp. 32-38.

Basilier, et al., "AAA Requirements for IP Telephony/Multimedia," Internet Draft, IETF, Jul. 2000.

R. Calhoun, "Diameter Mobile IP Extensions," IETF Internet Draft, Sep. 2000.

S. Glass, et al., "Mobile IP Authentication, Authorization, and Accounting Requirements," Network Working Group, RFC 2977, Oct. 2000.

Anonymous, "ARI's PartSmart Provides Electronic Price File Updates Over the Internet: Secure Website to Maintain Manufacturer Price Updates for Electronic Delivery to Dealers," Business Wire, Feb. 2002, pp. 1-2.

Anonymous, "Metris Adds Identity Theft Protection Plan to Fraud Alert Services," Business Wire, May 2002, pp. 1-3.

33GPP TS 33.203 V5.3.0 Technical Specification, $3^{rd}$ Generation Partnership Project, Technical Specification Group Services and System Aspects, 3G Security, Access Security for IP-Based Services, Release 5, Sep. 2002, pp. 1-37.

J. Arrko, et al., "Security Mechanism Agreement for the Session Initiation Protocol (SIP)," Internet Draft: Expires Apr. 28, 2003, Network Working Group, Oct. 28, 2002, pp. 1-22.

3GPP TS 33.203, 3rd Generation Partnership Project; Technical Specification Group Services and System Aspects; 3G Security; Access Security for Ip-based services (Release 5), pgs. 137, Mar. 2002.

Rosenberg et al., "Sip: Session Initiation Protocol", Internet Engineering Task Force, Internet Draft, Feb. 27, 2002.

Change Request, 3GPP TSG SA VVG3 Security - S3#23, S3-020292, May 2002.

\* cited by examiner

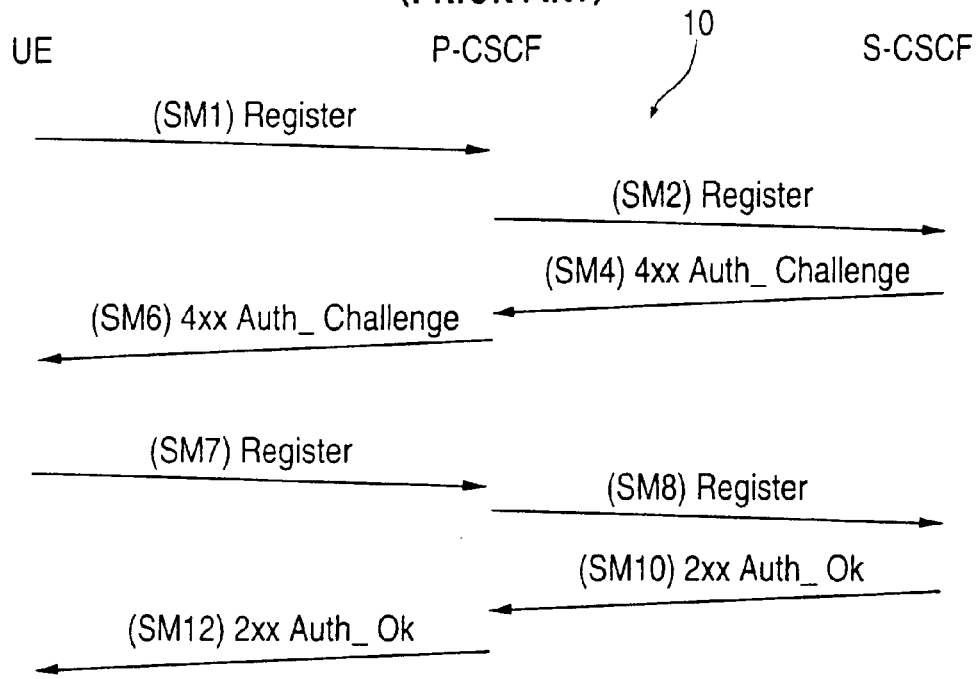
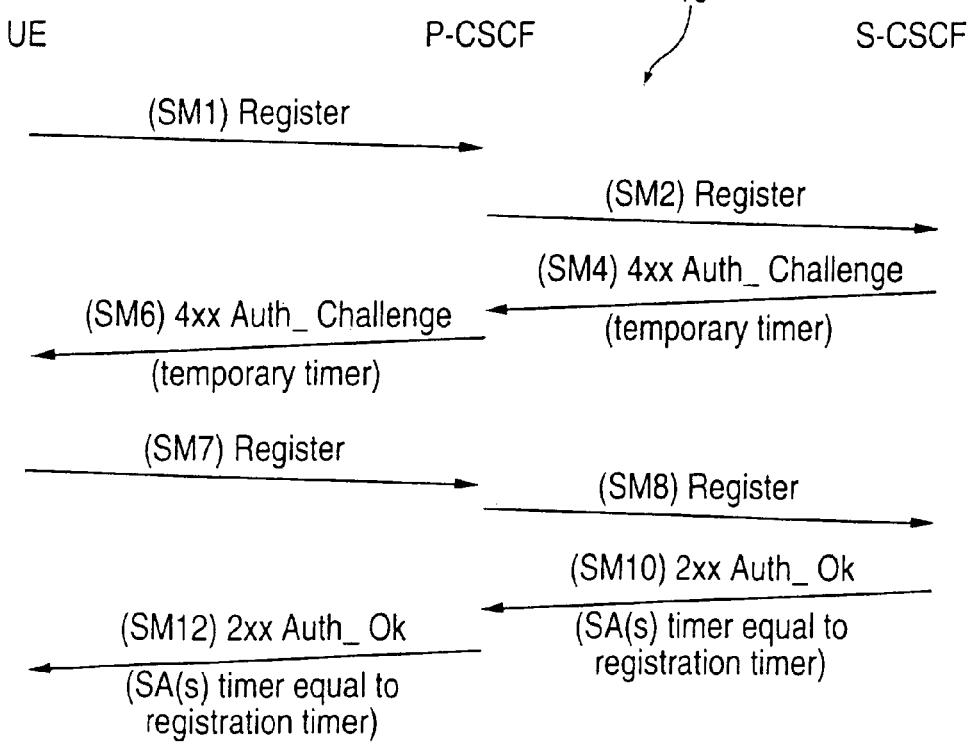

METHOD AND COMMUNICATION SYSTEM FOR CONTROLLING SECURITY ASSOCIATION LIFETIME

CROSS REFERENCE TO RELATED APPLICATION

This is a continuation application of U.S. patent application Ser. No. 10/345,418, now U.S. Pat. No. 7,434,258, filed on Jan. 16, 2003, which claims the benefit of U.S. Provisional Patent Application No. 60/377,965, filed on May 7, 2002. The subject matter of the earlier filed applications are hereby incorporated by reference.

BACKGROUND OF THE INVENTION

1. Field of the Invention

This invention relates to selecting a Security Association (SA) timer between user equipment (UE) and a control entity in a communication system and in a preferred application selecting a SA timer for IPSec SA between the UE and a proxy call state control function (P-CSCF) in a 3G communications environment.

2. Description of the Prior Art

FIG. 1 illustrates a block diagram of a successful set up of SAs as set forth in Section 7.2 of 3GPP TS 33.203 V5.3.0 (2002-03), which is incorporated herein by reference in its entirety.

In the packet switched domain, service is not provided until a SA is established between the UE and the communication system 10 such as the P-CSCF. An IP Multimedia Core Network Subsystem (IMS) is essentially an overlay to the packet switched domain and has a low dependency on the packet switched domain. Consequently, a separate SA is required between a multimedia UE (client) and the IMS before access is granted to multimedia services.

The SA set up procedure is necessary in order to decide what security services to apply and when the security services are to start in the IMS. In the IMS, authentication of users is performed during registration as specified in section 6.1 of the aforementioned 3GPP publication. Subsequent signalling communications in a session are integrity protected based on keys derived during the authentication process.

For protecting IMS signalling between the UE and the P-CSCF, it is necessary to agree on shared keys that are provided by the IMS Authentication and Key Agreement (AKA) protocol and a set of parameters specific to a protection method. The security mode set up as described below with reference to FIG. 1 is used to negotiate the SA parameters required for authentication, but without confidentiality. Section 7.1 of the aforementioned 3GPP publication describes the SA parameters.

FIG. 1 illustrates the normal case of setup of SAs using SIP protocol messages when failure does not occur. Some of the nodes and messages in a typical SIP architecture, which are not directly related to the set up of a SA, have been omitted. Accordingly, there are gaps in the numbering of messages and the Interrogating Call State Control Function (I-CSCF) has been omitted. The UE sends a SM1 REGISTER message to the P-CSCF and towards the Serving Call State Control Function (S-CSCF) to register the location of the UE and to set up the security mode. In order to start the security mode set-up procedure, the UE includes a security set-up line in the SM1 REGISTER message. The security set-up line in SM1 contains the Service Provisioning Infrastructure (SPI) numbers, the protected port selected by the UE and a list of identifiers for the integrity algorithms which the UE supports. Upon receipt of the SM1 REGISTER message by the P-CSCF, the P-CSCF temporarily stores the parameters received in the security set-up line together with the UE's IP address from the source IP address of the IP packet header, the IP multimedia IM Private Identity (IMPI) and the IM Public Identity (IMPU). The P-CSCF sends a SM2 REGISTER message to the S-CSCF. Upon receipt by the P-CSCF of a SM4 4xx Auth_Challenge message originated from the S-CSCF in response to the SM2 REGISTER message, the P-CSCF adds the key $IK_{IM}$ received from the S-CSCF to the temporary stored parameters. The P-CSCF then selects the SPI for the inbound SA. The P-CSCF defines the SPIs such that they are unique and different from any SPIs received in the security-set-up line of the UE. This role is needed since the UE and the P-CSCF use the same key for inbound and outbound traffic. In order to determine the integrity of the algorithm, the P-CSCF proceeds such that the P-CSCF has a list of integrity algorithms that the P-CSCF supports, ordered by priority. The P-CSCF selects the first integrity algorithm on its own which is also supported by the UE. The P-CSCF then establishes another pair of SAs in the local security association data base. The security set-up line in the SM6 message contains the SPI assigned by the P-CSCF and a fixed number of the protected port at the P-CSCF. The SM6 message also contains a list of identifiers for the integrity algorithms which the P-CSCF supports. Upon receipt of the SM6 message, the UE determines the integrity algorithm so that UE selects the first integrity algorithm on the list received from the P-CSCF in the SM6 message which is also supported by the UE. The UE then proceeds to establish another pair of SAs. The UE integrity protects the SM7 message and all the following SIP messages. The list of integrity algorithms received in SM6 message are included. After receiving the SM7 message from the UE, the P-CSCF checks whether the integrity algorithm list received in the SM7 message is identical with the integrity algorithms list in the SM6 message. If this is not the case, the registration procedure is aborted. The P-CSCF includes in the SM8 message information for the S-CSCF that the received message from the UE was integrity protected. The P-CSCF adds this information to all subsequent registration messages received from the UE that have successfully passed the integrity check in the P-CSCF. The S-CSCF sends a SM10 2xx Auth_Ok message to the P-CSCF. The P-CSCF sends a SM12 2xx Auth_Ok message to the UE. The SM12 message does not contain information specific to security mode setup (i.e., a security-set-up line). However, when the SM12 message does not indicate any error, the P-CSCF confirms that security mode setup has been successful. After receiving the SM12 message not indicating any error, the UE assumes successful completion of the security-mode set-up.

Every registration message that includes a user authentication attempt produces new SAs. If the authentication attempt is successful, then these new SAs replace previous ones. If the UE has an already active SA, then the UE uses this to protect the registration message. IF the S-CSCF is notified by the P-CSCF that the registration message from the UE was integrity protected, the S-CSCF may decide not to authenticate the user by means of the AKA protocol. However, the UE may send unprotected registration messages at any time. In this case, the S-CSCF authenticates the user by means of the AKA protocol. In particular, if the UE has an indication that the SA is no longer active at P-CSCF side, the UE sends an unprotected registration message. SAs may be unidirectional or bidirectional. For IP layer SAs, the lifetime is held at the application layer. Furthermore, deleting a SA means deleting the SA from both the application and the IPsec layer.

A UE is involved in only one registration procedure at a time. The UE removes any data relating to any previous incomplete registrations or authentications, including SAs created by an incomplete authentication. The UE may start a registration procedure with an existing pair of SAs. These SAs are referred to as an old SAs. The authentication produces a pair of new SAs. These new SAs shall not be used to protect non-authentication traffic until noted during the authentication of flow. In the same way, certain message in the authentication are protected with a particular SA. If the UE receives a message protected with incorrect SA, it shall discard the message.

RFC 3261, which is incorporated herein by reference in its entirety, describes the SIP protocol. As described in Section 10.3 therein, when a UE sends a REGISTER message, a registrant, which may be the P-CSCF, processes the request. The REGISTER message has a Contact address and Contact header field for each address.

The determination of the expiration time of registration of a UE is as follows:

(1) if the field value has an expires parameter, that value must be used.
(2) If there is no such parameter, but the request has an Expires header field, that value must be used.
(3) If there is neither, a locally configured default value must be used. The registrant may shorten the expiration interval.

With the SIP protocol, the so-called "non-INVITE transaction timeout timer" is 32 seconds. This timer is used as a temporary timer when sending the SM4 and SM6 messages as described above. The UE has 30 seconds to send the SM7 REGISTER message, containing the response to the SM6 4xx Auth_Challenge message by the network. When the authentication challenge in the SM6 message is answered in time with SM7 and SM8 REGISTER messages and the result is verified by the network, a SIP 200 Ok response is sent to the UE with messages SM10 and SM12 described above. The 200 Ok message contains an Expires header or a Contact field described above that indicates the time length of the registration of the UE with the control entity.

In the prior art, the SA timer can be set rather long, which results in network inefficiency in database management and the chance for UE to flood attack the P-CSCF with messages that require an appropriate response. If the UE does not have a SA with the network, such messages do not reach the P-CSCF which is preferred by the network operators because of more efficient use of resources.

In 3G communication systems, the UE has to register and re-register from time to time. When a re-registration is not requested within a specified time, subscriber data is deleted from the network elements responsible for handling the communications to and from the UE, such as the P-CSCF. Therefore, a registration timer is maintained in the UE to determine when re-registration is appropriate.

SUMMARY OF THE INVENTION

The present invention is a method for selecting a time length of a SA(s) between a UE which transmits and receives communications and a control entity in a communication system and a communication system in which the lifetime of a SA(s) is set with sufficient time to allow completion of the registration. This goal is accomplished with the invention by the UE setting the lifetime of each new SA(s) equal to the time duration of the registration timer which determines the time limit a registration of a UE is invalid. The SA(s) are set for bidirectional communications between the UE and the control entity of the communication system. In a preferred embodiment, the control entity is the P-CSCF. Also, in accordance with the invention, an old SA as is continued for one more interval than when deletion should occur when a new SA is set with a time duration equal to the registration times.

In accordance with a preferred embodiment of the invention using the SIP protocol, the SM1 REGISTER message is sent by the UE to register the UE with the IMS at the P-CSCF. If the SM1 message is protected, it is protected with an old outbound SA. The UE receives an authentication challenge in a SM6 message from the P-CSCF which is protected with the old outbound SA if the SM1 message was protected and is unprotected otherwise. If the SM6 message can be successfully processed by the UE, the UE creates at least one new SA, which is derived in accordance with the security association parameters of Section 7.1 of the 3GPP TS 33.203 V. 5.3.0 (2002-09). The lifetime of each new SA(s) created at this time is set to allow enough time to complete the registration procedure. The UE sends a SM7 message before expiration of a temporary timer value sent in the SM4 and SM6 messages to the P-CSCF which is protected with the new outbound SA. The P-CSCF sends a SM8 message to the S-CSCF. If the SM1 message was protected, the new SAs can now be used to protect messages other than those in the authentication. Furthermore, for outbound traffic, the new SA is used. The S-CSCF sends a SM10 message to the P-CSCF which uses the registration timer value contained in the Expires or Contact header to set the time duration of the new SA in the P-CSCF. The UE receives the SM12 message from the P-CSCF indicating successful authentication from the P-CSCF which is protected with the new outbound SA. The UE uses the registration time value contained in the Expires or Contact header to set the time duration of the new SA therein. After the successful processing of the message by the UE, registration is complete. The old SAs are now deleted or optionally may be retained for one more interval and the new SAs are used to protect all messages and have a time duration equal to a time length of the registration timer value contained in the SM10 and SM12 messages.

The present invention eliminates the problems of the prior art by eliminating the flooding of the P-CSCF with messages when the time duration of new SA(s), was not set to have any particular time length with respect to the registration timer and had a time duration longer than the registration timer for the UE to register with the control entity of the communication system. As a result of the invention, the efficiency of the communication system is enhanced in accordance with the present invention.

Certain embodiments of the present invention provide for an apparatus. The apparatus includes a transmitter configured to transmit a registration request message to a control entity in a communication system, whereby the registration request message is configured to request registration with the control entity. The apparatus further includes a receiver configured to receive an authentication challenge including a temporary timer, whereby the temporary timer is configured to set a time duration for the apparatus to respond to the authentication challenge. The receiver is further configured to receive an acknowledgement message including a security association timeout value in response to the transmitted registration message, whereby the security association timeout value includes a set time length of a security association equal to a registration time length set for registration of the apparatus. The transmitter is further configured to transmit a registration authentication message to the control entity before expiration of the temporary timer.

Certain embodiments of the present invention provide for a method. The method includes transmitting a registration message to a control entity in a communication system, wherein the registration request message is configured to request registration with the control entity, and receiving an authentication challenge including a temporary timer, whereby the temporary timer is configured to set a time duration to respond to the authentication challenge. The method further includes receiving an acknowledgement message including a security association timeout value in response to the transmitted registration message, whereby the security association timeout value includes a set time length of a security association equal to a registration time length set for registration of the apparatus, and transmitting a registration authentication message to the control entity before expiration of the temporary timer.

Certain embodiments of the present invention provide for an apparatus. The apparatus includes transmitting means for transmitting a registration request message to a control entity in a communication system, whereby the registration request message is configured to request registration with the control entity. The apparatus further includes receiving means for receiving an authentication challenge comprising a temporary timer, whereby the temporary timer is configured to set a time duration for the apparatus to respond to the authentication challenge. The receiving means is further for receiving an acknowledgement message comprising a security association timeout value in response to the transmitted registration message, whereby the security association timeout value comprises a set time length of a security association equal to a registration time length set for registration of the apparatus. The transmitting means is further for transmitting a registration authentication message to the control entity before expiration of the temporary timer.

Certain embodiments of the present invention provide for a computer readable storage medium encoded with instructions that, when executed by a computer, perform a process. The process includes transmitting a registration message to a control entity in a communication system, wherein the registration request message is configured to request registration with the control entity. The process further includes receiving an authentication challenge comprising a temporary timer, whereby the temporary timer is configured to set a time duration to respond to the authentication challenge. The process further includes receiving an acknowledgement message comprising a security association timeout value in response to the transmitted registration message, whereby the security association timeout value comprises a set time length of a security association equal to a registration time length set for registration of the apparatus. Further, the process includes transmitting a registration authentication message to the control entity before expiration of the temporary timer.

BRIEF DESCRIPTION OF THE DRAWINGS

FIG. 1 illustrates the prior art registration of a UE in a communication system using the SIP protocol including P-CSCF and S-CSCF control entities therein.

FIG. 2 illustrates a method of setting the time duration of a new SA(s) to be equal to the registration timer controlling registration of a UE as in the prior art system of FIG. 1.

Like parts are identified identically in FIGS. 1 and 2.

DESCRIPTION OF THE PREFERRED EMBODIMENT

Figure 3:
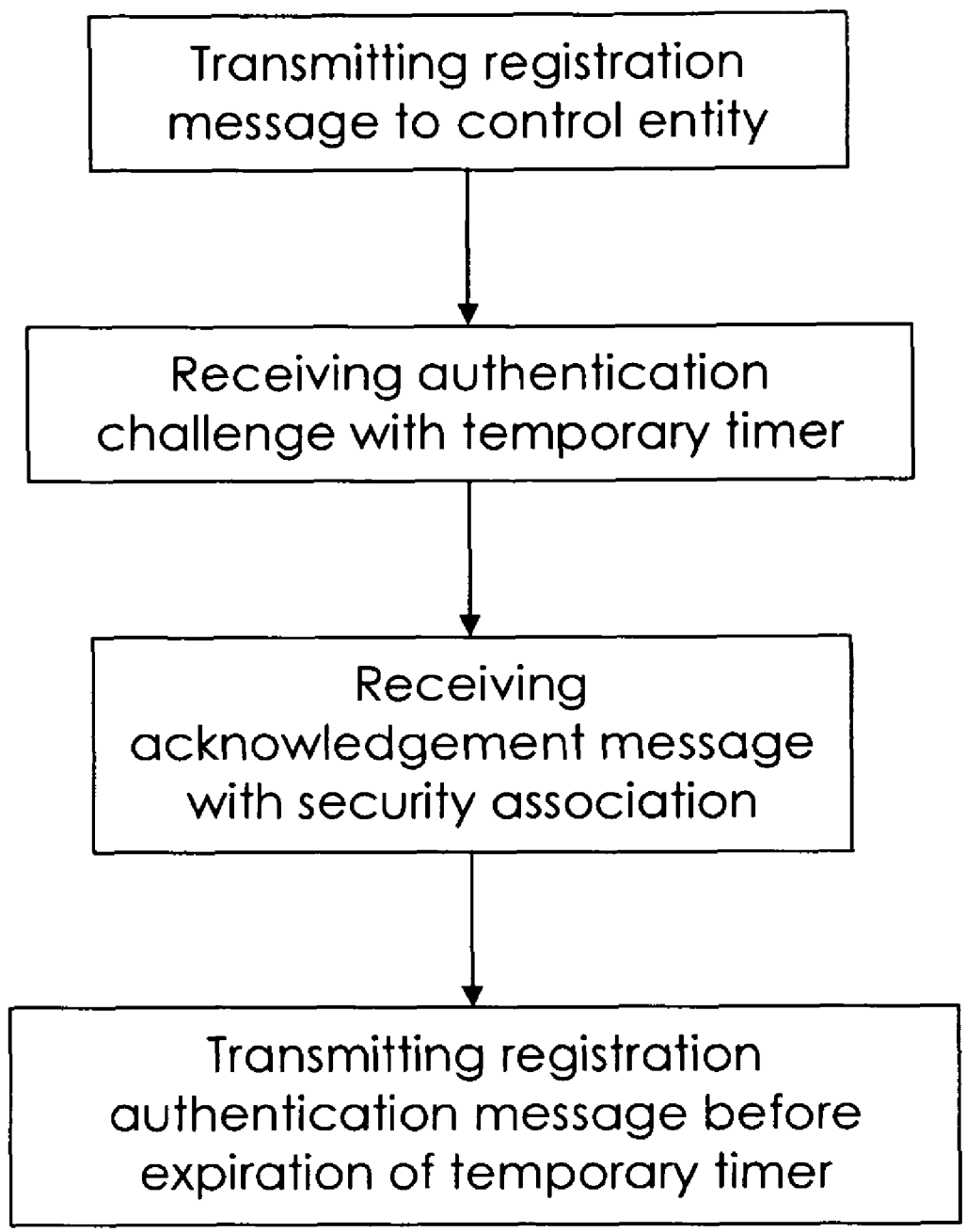
FIG. 3 illustrates a flow chart of the method according to a preferred embodiment of the present invention.

A communication system and a method which sets the SA(s) to have a timer duration equal to the registration timer defining when registration of a UE is valid in accordance with the invention is described in conjunction with FIG. 2 and FIG. 3. While the invention has been described with reference to the SIP protocol, it should be understood that the invention is not limited thereto.

The first step in FIG. 2 and FIG. 3 is that the UE sends a registration message to a communication system control entity requesting registration of the UE. The control entity in a preferred embodiment is a P-CSCF and the registration message is the SM1 SIP REGISTER message transmitted to the P-CSCF in accordance with the prior art. The P-CSCF forwards the registration message, which preferably is the SM2 SIP REGISTER message, to the S-CSCF. The S-CSCF sends an authentication challenge message which preferably is the SIP SM4 message 4xx AUTH_Challenge message to the P-CSCF. The P-CSCF sends an authentication challenge message, which is preferably the SIP protocol SM6 4xx AUTH_Challenge, to the UE. The SM4 and SM6 authentication challenge messages include a temporary timer setting a time limit for the UE to transmit registration message, which preferably is the SM7 REGISTER message of the SIP protocol, in response to the authentication challenge message SM6. In one embodiment of the invention, the temporary timer value is set equal to 32 seconds, which is the non-INVITE transaction timeout timer of the SIP protocol. The P-CSCF determines by processing the SM7 message if the UE has responded within the temporary timer value. If the temporary timer expires, the registration process and the setting of SA is aborted. The P-CSCF then sends a register message, which is preferably the SIP protocol SM8 REGISTER message, to the S-CSCF. The S-CSCF sets the time length of its SA for the P_CSCF equal to the registration timer limit contained in the SM8 message. The set time limit for the SA, which is equal to the registration timer, is sent as part of the SM10 message to the P-CSCF and then from the P-CSCF as the SM12 message to the UE. When the invention is practiced with the SIP protocol, the Expires or Contact Fields may be used to contains the set timer limit for the new SA(s). The P-CSCF also sets its SA time interval to be equal to the registration timer interval. The P-CSCF forwards the set value of its SA timer, which is equal to the registration timer, to the UE. The UE sets the time limit for its SA for communications with the P-CSCF to be equal to a registration timer length set by the UE defining when registration of the UE with the control entity is valid. The time length of the SAs is for bidirectionally communications between the P-CSCF and the UE. The invention is not limited to the SA time limit being sent by the SM10 and SM12 messages and is not limited to using the Expires and Contact headers to transmit the SA time limit to the P-CSCF and the UE. The time limit is preferably transmitted as part of the acknowledgment message which, in a preferred embodiment, is the SM10 and SM12 messages of the SIP protocol, which are responsive to the SM8 registration message received by the S-CSCF. Setting of the one or more SAs equal to the time length of the registration timer between the UE and the P-CSCF ensures that the problem of the prior art of flooding the P-CSCF with messages is eliminated as described above.

While the present invention has been described in terms of its preferred embodiments, it should be understood that numerous modifications may be made thereto without departing from the spirit and scope of the present invention. It is intended that all such modifications fall within the scope of the appended claims.

The invention claimed is:

1. An apparatus implemented in hardware including hardware configured to operate with software, including: a transmitter configured to transmit a registration request message to a control entity in a communication system, wherein the registration request message is configured to request registration with the control entity; and a receiver configured to receive an authentication challenge comprising a temporary timer, wherein the temporary timer is configured to set a time duration for the apparatus to respond to the authentication challenge, wherein the receiver is further configured to receive an acknowledgement message comprising a security association timeout value in response to the transmitted registration message, wherein the security association timeout value comprises a set time length of a security association equal to a registration time length set for registration of the apparatus, and wherein the transmitter is further configured to transmit a registration authentication message to the control entity before expiration of the temporary timer.

2. The apparatus of claim 1, wherein communications with the control entity comprise a session initiation protocol.

3. The apparatus of claim 2, wherein the session initiation protocol comprises a header comprising the set time length of the security association.

4. The apparatus of claim 3, wherein the header comprises one of an expires header or a contact header, each header comprising the set time length of the security association.

5. The apparatus of claim 1, wherein the registration request message comprises a session initiation protocol register message.

6. The apparatus of claim 1, wherein the acknowledgement message comprises a session initiation protocol response message.

7. The apparatus of claim 6, wherein the session initiation protocol response message comprises a 200 Auth_Ok message.

8. The apparatus of claim 1, wherein the transmitter is further configured to transmit the registration authentication message to the control entity in response to the authentication challenge within the time duration set to respond to the authentication challenge.

9. The apparatus of claim 1, wherein the control entity is a call state control function.

10. A method, comprising:
   transmitting, by a user equipment, a registration message to a control entity in a communication system, wherein the registration request message is configured to request registration with the control entity; and
   receiving, by the user equipment, an authentication challenge comprising a temporary timer, wherein the temporary timer is configured to set a time duration to respond to the authentication challenge;
   receiving, by the user equipment, an acknowledgement message comprising a security association timeout value in response to the transmitted registration message, wherein the security association timeout value comprises a set time length of a security association equal to a registration time length set for registration of the user equipment; and
   transmitting, by the user equipment, a registration authentication message to the control entity before expiration of the temporary timer.

11. The method of claim 10, further comprising: communicating with the control entity using a session initiation protocol.

12. The method of claim 11, wherein the session initiation protocol comprises a header comprising the set time length of the security association.

13. The method of claim 12, wherein the header comprises one of an expires header or a contact header, each header comprising the set time length of the security association.

14. The method of claim 10, wherein the registration request message comprises a session initiation protocol register message.

15. The method of claim 10, wherein the acknowledgement message comprises a session initiation protocol response message.

16. The method of claim 10, wherein the session initiation protocol response message comprises a 200 Auth_Ok message.

17. The method of claim 10, the transmitting the registration authentication message to the control entity comprises transmitting the registration authentication message within the time duration set to respond to the authentication challenge.

18. An apparatus, implemented in hardware including hardware configured to operate with software, including: a transmitter for transmitting a registration request message to a control entity in a communication system, wherein the registration request message is configured to request registration with the control entity; and a receiver for receiving an authentication challenge comprising a temporary timer, wherein the temporary timer is configured to set a time duration for the apparatus to respond to the authentication challenge, wherein the receiver is further configured for receiving an acknowledgement message comprising a security association timeout value in response to the transmitted registration message, wherein the security association timeout value comprises a set time length of a security association equal to a registration time length set for registration of the apparatus, and wherein the transmitter is further configured for transmitting a registration authentication message to the control entity before expiration of the temporary timer.

19. A non-transitory computer readable medium encoded with instructions that, when executed by a computer, perform a process comprising: transmitting a registration message to a control entity in a communication system, wherein the registration request message is configured to request registration with the control entity; and receiving an authentication challenge comprising a temporary timer, wherein the temporary timer is configured to set a time duration to respond to the authentication challenge; receiving an acknowledgement message comprising a security association timeout value in response to the transmitted registration message, wherein the security association timeout value comprises a set time length of a security association equal to a registration time length set for registration of the apparatus; and transmitting a registration authentication message to the control entity before expiration of the temporary timer.

* * * * *